US009055067B1

(12) United States Patent
Ward, Jr. et al.

(10) Patent No.: US 9,055,067 B1
(45) Date of Patent: Jun. 9, 2015

(54) FLEXIBLE-LOCATION RESERVATIONS AND PRICING FOR NETWORK-ACCESSIBLE RESOURCE CAPACITY

(75) Inventors: David John Ward, Jr., Seattle, WA (US); David Nunnerley, Seattle, WA (US); Matthew S. Garman, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 494 days.

(21) Appl. No.: 13/429,957

(22) Filed: Mar. 26, 2012

(51) Int. Cl.
G06F 15/173 (2006.01)
H04L 29/08 (2006.01)

(52) U.S. Cl.
CPC ............... *H04L 67/10* (2013.01); *H04L 67/34* (2013.01)

(58) Field of Classification Search
CPC ................................. H04L 67/10; H04L 67/34
See application file for complete search history.

(56) References Cited

U.S. PATENT DOCUMENTS

| | | | |
|---|---|---|---|
| 5,692,174 A | 11/1997 | Bireley et al. | |
| 6,421,728 B1 | 7/2002 | Mohammed et al. | |
| 6,493,685 B1 | 12/2002 | Ensel et al. | |
| 7,412,538 B1 | 8/2008 | Eytchison et al. | |
| 7,637,426 B1 | 12/2009 | Green | |
| 7,743,001 B1 | 6/2010 | Vermeulen et al. | |
| 7,768,920 B2 | 8/2010 | Goshen et al. | |
| 7,870,044 B2 | 1/2011 | Robertson | |
| 8,024,225 B1 | 9/2011 | Sirota et al. | |
| 8,595,191 B2 | 11/2013 | Prahlad et al. | |
| 8,615,584 B2 | 12/2013 | Dawson et al. | |
| 2003/0028642 A1 | 2/2003 | Agarwal et al. | |
| 2003/0088482 A1 | 5/2003 | Blumberg | |
| 2003/0126196 A1 | 7/2003 | Lagimonier et al. | |
| 2003/0229529 A1 | 12/2003 | Mui et al. | |
| 2004/0030740 A1 | 2/2004 | Stelting | |
| 2004/0243430 A1 | 12/2004 | Horstemeyer | |
| 2006/0136926 A1* | 6/2006 | Goldick | 718/104 |
| 2006/0159014 A1 | 7/2006 | Breiter et al. | |

(Continued)

OTHER PUBLICATIONS

Amazon (Amazon web services, Amazon Elastic Compute Cloud (Amazon EC2), Mar 15 2010, pp. 1-8, retrieved using internet archive waybackmachine from http://web.archive.org/web/20100315184337/http://aws.amazon.com/ec2/ on Jul. 8, 2014).*

(Continued)

*Primary Examiner* — Brian J Gillis
*Assistant Examiner* — Michael A Keller
(74) *Attorney, Agent, or Firm* — Robert C. Kowert; Meyertons, Hood, Kivlin, Kowert & Goetzel, P.C.

(57) ABSTRACT

Methods and apparatus for flexible-location reservations and pricing for network-accessible resources are disclosed. A system includes a plurality of resources of a provider network distributed across multiple locations, and a resource manager. The resource manager implements a programmatic interface to allow a client to specify a flexible location option for a resource reservation request, indicating that the resource manager is to select one or more locations at which to reserve resource capacity. When a reservation request with the flexible location option specified is received, the resource manager selects a particular location based at least in part on heuristics using resource utilization data. In response to a resource activation request for the reservation, the resource manager activates a resource at a launch location selected from the multiple locations.

25 Claims, 10 Drawing Sheets

(56) References Cited

U.S. PATENT DOCUMENTS

| | | | | |
|---|---|---|---|---|
| 2007/0123297 | A1* | 5/2007 | Chan et al. | 455/550.1 |
| 2007/0219837 | A1 | 9/2007 | Lu et al. | |
| 2007/0260831 | A1* | 11/2007 | Michael et al. | 711/162 |
| 2008/0103848 | A1 | 5/2008 | Santos et al. | |
| 2008/0167928 | A1 | 7/2008 | Cao et al. | |
| 2008/0243666 | A1 | 10/2008 | Rowan | |
| 2009/0049114 | A1 | 2/2009 | Faraj | |
| 2009/0182598 | A1 | 7/2009 | An et al. | |
| 2009/0241030 | A1* | 9/2009 | von Eicken et al. | 715/735 |
| 2009/0276771 | A1 | 11/2009 | Nickolov et al. | |
| 2009/0281952 | A1 | 11/2009 | Toffey et al. | |
| 2010/0010657 | A1 | 1/2010 | Do et al. | |
| 2010/0050172 | A1 | 2/2010 | Ferris | |
| 2010/0070397 | A1 | 3/2010 | Hahn-Carlson et al. | |
| 2010/0131959 | A1* | 5/2010 | Spiers et al. | 718/105 |
| 2010/0198973 | A1* | 8/2010 | Jung et al. | 709/226 |
| 2010/0241479 | A1 | 9/2010 | Chaushev | |
| 2010/0322108 | A1* | 12/2010 | D'Souza et al. | 370/254 |
| 2011/0145094 | A1 | 6/2011 | Dawson et al. | |
| 2011/0145392 | A1 | 6/2011 | Dawson et al. | |
| 2011/0154353 | A1 | 6/2011 | Theroux et al. | |
| 2011/0295986 | A1 | 12/2011 | Ferris et al. | |
| 2011/0296025 | A1 | 12/2011 | Lieblich et al. | |
| 2012/0016721 | A1 | 1/2012 | Weinman | |
| 2012/0030456 | A1* | 2/2012 | Wu et al. | 713/2 |
| 2012/0131161 | A1 | 5/2012 | Ferris et al. | |
| 2012/0159506 | A1 | 6/2012 | Barham et al. | |
| 2012/0173725 | A1 | 7/2012 | Verma | |
| 2013/0091282 | A1* | 4/2013 | Tontiruttananon et al. | 709/226 |
| 2013/0111027 | A1 | 5/2013 | Milojicic et al. | |
| 2013/0173418 | A1 | 7/2013 | Goad et al. | |
| 2013/0212279 | A1 | 8/2013 | Dutta et al. | |
| 2013/0232252 | A1 | 9/2013 | Huang et al. | |
| 2013/0238785 | A1* | 9/2013 | Hawk et al. | 709/224 |
| 2013/0246208 | A1 | 9/2013 | Jain et al. | |

OTHER PUBLICATIONS

U.S. Appl. No. 13/535,720, filed Jun. 28, 2012, Matthew D. Klein, et al.
U.S. Appl. No. 13/535,715, filed Jun. 28, 2012, Matthew D. Klein, et al.
U.S. Appl. No. 13/535,707, filed Jun. 28, 2012, Matthew D. Klein, et al.
U.S. Appl. No. 13/535,725, filed Jun. 28, 2012, Matthew D. Klein, et al.
AWS Documentation, "Using Cluster Instances," downloaded from docs.amazonwebservices.com/AWSEC2/latest/UserGuide/using_cluster_computing.html on May 16, 2012, pp. 1-6.
Amazon Web Services: AWS Products & Solutions, "High Performance Computing (HPC) on AWS," downloaded from aws.amazon.com/hpc-applications/ on May 16, 2012, pp. 1-3.
Timo Schneider (personal website), "An Oblivious Routing Congestion Simulator," downloaded from perlplexity.org/Research/ORCS/ on May 16, 2012, pp. 1-8.
U.S. Appl. No. 13/431,379, filed Mar. 27, 2012, David John Ward, Jr.
U.S. Appl. No. 13/431,388, filed Mar. 27, 2012, David John Ward, Jr., et al.
U.S. Appl. No. 13/431,355, filed Mar. 27, 2012, David John Ward, Jr.
U.S. Appl. No. 13/429,985, filed Mar. 26, 2012, David John Ward, Jr., et al.
U.S. Appl. No. 13/431,348, filed Mar. 27, 2012, David John Ward, Jr., et al.
U.S. Appl. No. 13/431,360, filed Mar. 27, 2012, David John Ward, Jr.
U.S. Appl. No. 13/430,003, filed Mar. 26, 2012, David John Ward, Jr., et al.
U.S. Appl. No. 13/431,393, filed Mar. 27, 2012, David John Ward, Jr.
U.S. Appl. No. 13/475,399, filed May 18, 2012, David John Ward, Jr.
U.S. Appl. No. 13/475,359, filed May 18, 2012, David John Ward, Jr.
U.S. Appl. No. 13/461,605, filed May 1, 2012, David John Ward, Jr., et al.
U.S. Appl. No. 13/476,828, filed May 21, 2012, David John Ward, Jr., et al.
U.S. Appl. No. 13/475,461, filed May 18, 2012, David John Ward, Jr., et al.
U.S. Appl. No. 13/331,750, filed Dec. 20, 2011, Amazon Technologies, Inc., all pages.
Amazon Web Services, "Discussion Forums; Existing Connections Dropped Rudely when Instance Taken out of ELB", Eric Hammond, Feb. 25, 2011, pp. 1-4.
Amazon Web Services, "Amazon Elastic Compute Cloud (Amazon EC2)", Mar. 24, 2011, pp. 1-26.
Amazon Web Services, "Amazon EC2 Pricing", Feb. 28, 2011, pp. 1-13.
Amazon Web Services, "Amazon EC2 Spot Instances", Feb. 24, 2011, pp. 1-5.
Amazon Web Services, "Amazon CloudWatch", Feb. 24, 2011, pp. 1-5.
Agarwal, Sharad, et al. "Volley: Automated Data Placement for Geo-Distributed Cloud Services." 2010, pp. 1-16.

* cited by examiner

600

Reservation Request Page https://<website>.com/reserveRequest

Please select the types of resources you'd like us to reserve. ← 603

Reminder – if you let us choose the location of your instances, you get a 10% discount! Click here to learn more. ← 604

Resource Reservation Request Details

| | | |
|---|---|---|
| Resource instance size | Medium (default) | ← 605 |
| Number of instances | 1 (default) | ← 607 |
| Reservation duration | One year (default) | ← 609 |
| Reservation start date | Today (default) | ← 611 |
| High-availability reservation replication count (Click here to learn more) | 1 (default) | ← 613 |
| Region | I don't care – you choose the region | ← 615 |
| Availability zone | I don't care – you choose the availability zone | ← 617 |
| Reservations transferability preference | I don't care (default) | ← 619 |
| Interruptibility preference | Do not interrupt (default) | ← 621 |
| Base Price (click here for details) | | ← 623 |
| Discounts (location and transferability) (click here for details) | 10% | ← 625 |
| Net Price (click here for details) | | ← 627 |

[ Next ] ← 631

*Figure 6*

FLEXIBLE-LOCATION RESERVATIONS AND PRICING FOR NETWORK-ACCESSIBLE RESOURCE CAPACITY

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

In many environments, operators of provider networks that implement different types of virtualized computing, storage, and/or other network-accessible functionality allow customers to reserve or purchase access to resources in any of several different resource acquisition modes. For example, a customer may reserve a virtual compute resource instance for a relatively long duration, such as one year or three years, or a customer may purchase resources for shorter terms on an ad-hoc basis as needed. For some types of resource reservations, at least a portion of the price paid by the customer may fluctuate over time in response to changing demand and supply of the resources within the provider network. The provider network operator may have to try to ensure that a number of potentially competing demands are met, e.g., that all guaranteed commitments to clients (such as long-term reservations that have already been paid for) are honored, that the vast majority of requests for shorter-term resource use are granted, that the dynamically-varying component of resource pricing does not get so high that customer satisfaction suffers, that the provider's data center investment is justified by a reasonable level of resource utilization and revenue, and so on. In attempting to match resources to client needs as efficiently as possible, the provider network operator may wish to implement techniques and policies that tend to encourage clients to allow the operator greater flexibility in making operational decisions.

BRIEF DESCRIPTION OF THE DRAWINGS

FIG. 6 illustrates a portion of an example web-based interface that may be implemented by a resource manager to allow clients to submit resource reservation requests, according to some embodiments.

Figure 1:
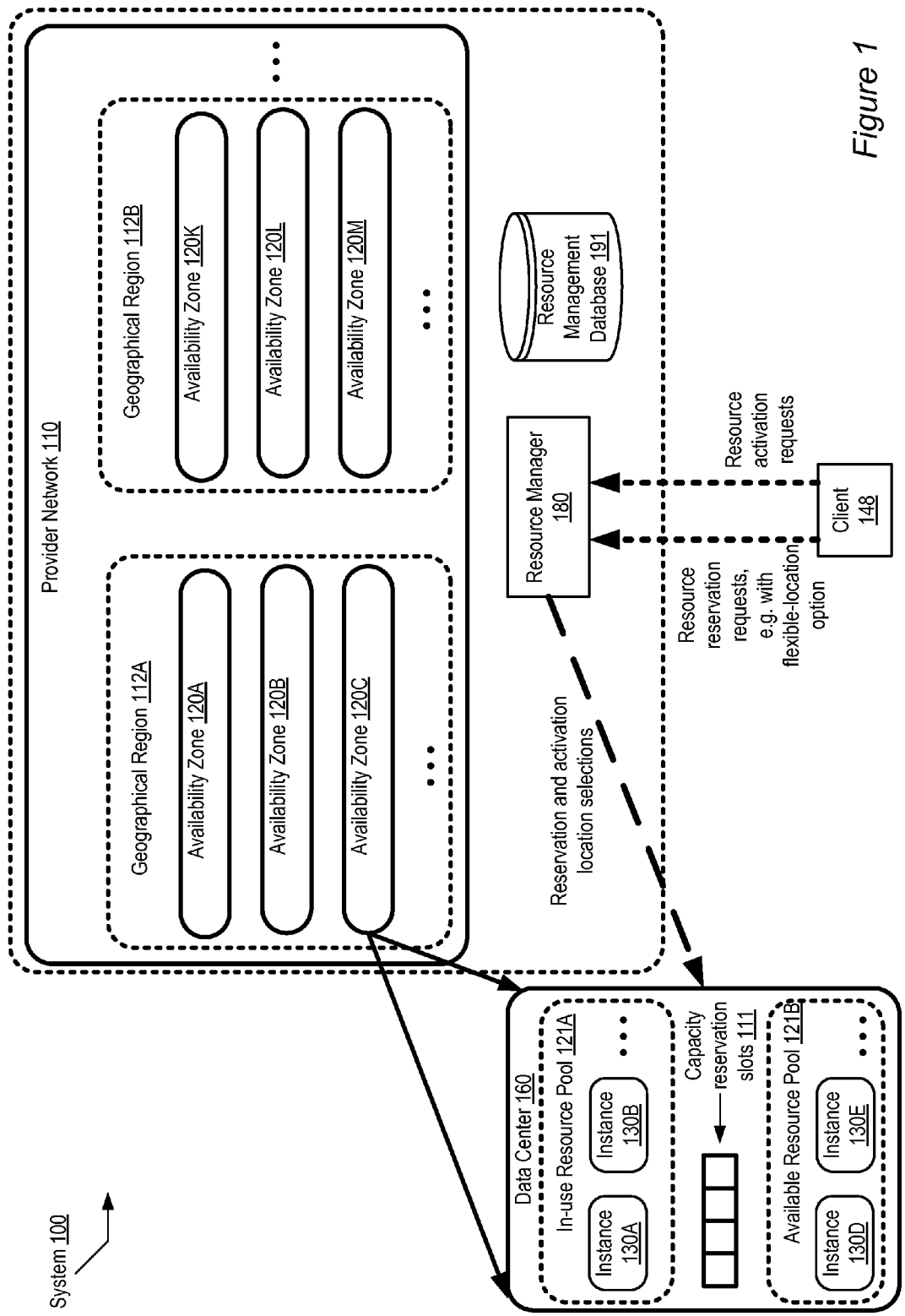
FIG. 1 illustrates an example system environment, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods and apparatus for managing flexible-location reservations and pricing of network-accessible resource capacity are described. Networks set up by an entity such as a company or a public sector organization to provide one or more services (such as various types of cloud-based computing or storage) accessible via the Internet and/or other networks to a distributed set of clients may be termed provider networks in this document. Such a provider network may include numerous data centers hosting various resource pools, such as collections of physical and/or virtualized computer servers, storage devices, networking equipment and the like, needed to implement and distribute the infrastructure and services offered by the provider. The resources may in some embodiments be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices and the like.

Operators of such provider networks may in some instances implement a flexible set of resource reservation, control and access interfaces for their clients. For example, a resource manager of the provider network may implement a programmatic interface (e.g., via a web site or a set of web pages) that allows clients to learn about, select, purchase access to, and/or reserve resource instances. Such an interface may include capabilities to allow browsing of a resource catalog, provide details and specifications of the different types or sizes of resources supported, the different reservation types or modes supported, pricing models, and so on. The provider network may support several different purchasing modes (which may also be referred to herein as reservation modes) in one embodiment: for example, long-term reservations, on-demand resource allocation, or spot-price-based resource allocation. Using the long-term reservation mode, a client may make a low, one-time, upfront payment for a resource instance, reserve it for a specified duration such as a one or three year term, and pay a low hourly rate for the instance; the client would be assured of having the reserved instance available for the term of the reservation. Using on-demand mode, a client could pay for capacity by the hour (or some appropriate time unit), without any long-term commitments or upfront payments. In the spot-price mode, a client could specify the maximum price per unit time that it is willing to pay for a particular type of resource, and if the client's maximum price exceeded a dynamic spot price determined at least in part by supply and demand, that type of resource would be provided to the client. In some embodiments, dynamically resizable pools of resource instances may be set aside for the different reservation types or modes—e.g., long-term reserved instances may be allocated from one pool, on-demand instances from another, and so on. During periods when the supply of the requested resource type exceeded the demand, the spot price may become significantly lower than the price for on-demand mode. In some implementations, if the spot price increases beyond the maximum bid specified by a client, a resource allocation may be interrupted—i.e., a resource instance that was previously allocated to the client may be reclaimed by the resource manager and may be allocated to some other client wishes to activate one or more instances that were previously reserved but had not yet been activated, or to a client that is willing to pay a higher spot price. The resource manager may thus be able to use reserved (but currently unused) resource capacity to meet spot-market demand, or even to satisfy on-demand instance requests, thereby increasing overall resource utilization levels without sacrificing the guarantees for long-term reservations. In addition to long-term reserved instances, on-demand instances and spot instances, other purchasing modes or combinations of modes may be implemented by the resource manager in some embodiments.

In some embodiments the provider network may be organized into a plurality of geographical regions, and each region may include one or more availability zones. An availability zone in turn may comprise one or more distinct locations or data centers, engineered in such a way that the resources in a given availability zone are insulated from failures in other availability zones. For example, each availability zone may have independent power-related and temperature control equipment, to ensure that a power or temperature problem in one availability zone does not cause problems at other availability zones. A failure in one availability zone may not be expected to result in a failure in any other availability zone; thus, the availability profile of a resource instance is intended to be independent of the availability profile of a resource instance in a different availability zone. The term "location", as used herein, may refer broadly to a portion or all of a data center, an availability zone, a geographical region, or any other similar aggregation into which the resources of the provider network may be organized. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster). Some clients may wish to specify the locations at which their resources are reserved and/or instantiated, e.g., at either the region level, the availability zone level, or a data center level, to maintain a desired degree of control of exactly where various components of their applications are run. Other clients may be less interested in the exact location where their resources are reserved or instantiated, as long as the resources meet the client requirements, e.g., for performance, high availability, supported software levels, and so on. In fact, for the latter set of clients, the ability to allow the resource manager to make location decisions may be a benefit in and of itself, as it may reduce the number of choices that the clients have to make. At the same time, the ability to choose the locations at which resource capacity is reserved or instantiated may help the resource manager in its efforts to balance supply and demand across different physical locations of the provider network—e.g., during time periods when load or usage is expected to peak at one data center or availability zone, the resource manager may wish to redirect some incoming requests to other data centers that happen to be experiencing lower levels of resource utilization.

According to some embodiments, therefore, a resource manager of a provider network whose resources are spread over multiple locations may implement a programmatic interface to specify a flexible location option for a resource reservation request. The flexible location option, when specified by a client for a resource reservation request, may indicate that the resource manager is to select one or more locations at which to reserve resource capacity in response to the request, instead of the client having to select the locations. Those clients that wish to specify the locations (e.g., availability zones or regions) where resource capacity is to be reserved may also be allowed to do so, e.g., via a different selection made via the interface. When a resource reservation request is received in accordance with the interface, with the flexible location option specified, the resource manager may select one or more particular locations at which resource capacity is to be reserved for the client. In some implementations the resource manager may use one or more heuristics, e.g., using resource utilization data as described below, in making the location choice. The resource manager may then reserve capacity at the chosen location or locations, e.g., by reserving one or more "slots" for resource instances at the locations on behalf of the client. A reservation slot may serve as a logical representation of a commitment made by the resource manager that when a resource activation request is received from the client (e.g., a request to "launch" or boot up a virtual compute server), an instance with a specific set of characteristics will be activated by the resource manager. The resource manager may inform the client that a reservation of resource capacity with the requested characteristics has been made. In some implementations the resource manager may inform the client specifically where the capacity has been reserved, while in other implementations the location may not be divulged to the client, at least as a default. In some embodiments the interface may allow a client to submit a query to determine where resource capacity has been reserved for the client.

After the resource manager reserves capacity at a location of its choice in response to a client reservation request indicating the flexible location option, at some later point in time a resource activation request corresponding to the reservation request may be received. In some cases, the resource activation request may be received within a very short time after the reservation is made; in other cases, the client may wait for a while (e.g., days, weeks, or months) before submitting a resource activation request. The activation request may be submitted via the same interface or the same kind of interface that was used for the reservation request in some embodiments, while in other embodiments different interfaces may be used for the two types of requests. When the activation request is received, the resource manager may activate one or more resources, e.g., virtual compute instances, at selected launch locations. In many scenarios, a resource may be launched or activated at the same location at which capacity was initially reserved in response to the reservation request. However, in other scenarios, for a variety of reasons, the resource manager may transfer the capacity reservation from the initial location to a different location, either when the activation request is received or during the time between the reservation and activation requests. That is, the location at which a resource is activated may differ from the location at which the initial reservation was set up. In one embodiment the resource manager may transfer the capacity reservation (e.g., a reservation slot or slots) from a location X to a location Y, for example, if the demand for active resources at location X grew substantially while the number of unused resources at location Y remained high. The resource manager may use monitoring information on the operational conditions at various locations (e.g., the trends of resource utilization, incoming request rates for different types of resources and reservations, pricing trends of different types of resources at different locations, network usage trends, and so on) to transfer reservations in some embodiments. In another embodiment, the client that submitted the original request may be allowed to submit a transfer request for a reservation, either with the resource activation request or prior to submitting the resource activation request. Clients may wish to transfer reservations for a number of different reasons—e.g., for pricing reasons, or to locate more of their resources and applications closer to each other, or for high availability reasons. In some implementations, clients may be allowed to review and/or approve launch locations for their reservations.

As noted above, in some embodiments the resource manager may use one or more heuristics, some of which may be based on resource utilization data, to determine the locations at which capacity is reserved for a client. For example, in one embodiment, if the client is utilizing active resource instances at one or more locations, one of those locations may be selected for a new capacity reservation for the same client. Such a location choice would be helpful to the client, for example, if the applications being run on the currently active resource instances need to communicate extensively with the applications eventually started on the newly-reserved resources, since the performance of network connections within a single location may in general exceed the performance of network connections spanning different locations. In another embodiment, if a client has existing reservations at one or more locations, those same locations may be selected for additional reservations requested by the client. In one implementation, a location at which the client had previously activated a resource may be selected for a new reservation for the same client. The resource manager may look up resource reservation and usage history of the client, which may be retained for a retention period in a resource management database in some embodiments, to help implement the heuristics or algorithms used to select reservation locations in scenarios where the client opts to use the flexible location option.

According to one embodiment, clients may be allowed to indicate high availability requirements for their reservation requests. For example, a client may wish to ensure that even in the event of a failure at some availability zone or zones, a resource instance of the desired performance and other capabilities specified in the resource request can be activated rapidly somewhere when needed by the client. In such an embodiment, when the resource manager receives a reservation request indicating that the client desires a high availability capacity reservation, and is still willing to let the resource manager select the exact reservation locations, the resource manager may select multiple locations at which to reserve capacity. For example, in one scenario the client may specify the flexible location option as well as a high availability reservation replication count of two, indicating that respective slots are to be reserved in two distinct availability zones. The resource manager may then select two different availability zones, and make capacity reservations at both availability zones for the client. When the client eventually requests the activation of the reservation, one of the two reservation locations may be chosen as the launch location (assuming no reservation transfers have occurred in the interim). In some embodiments a client that is concerned about high availability may, in addition to requesting multiple reservations in different availability zone, request the activation of multiple instances as well. The resource manager may ensure that the desired number of slots remain reserved in different availability zones for high-availability reservation requests, even if reservations are transferred between the time of the initial reservation and the corresponding activation requests.

In some embodiments the resource manager may allow the client to specify a group of preferred locations, and the resource manager may attempt to select the specific locations at which capacity is reserved from the specified group of locations. For example, in one embodiment the client may specify a particular region as a preferred region, and the resource manager may select an availability zone from that region for the reservation. In another embodiment the client may select any desired number of preferred availability zones (either within a single region or spread over multiple regions), and the reservation may be made at one of the selected availability zone. Preferences may be expressed at a different geographical level rather than at availability zone levels or region levels in some embodiments.

As noted above, for some clients the flexible location option may represent a beneficial simplification of the reservation process, since fewer choices have to be made by the client if the resource manager has the responsibility of selecting where capacity is to be reserved. In some embodiments, the resource manager may provide additional incentives to those clients that are willing to let the resource manager choose the reservation and/or launch locations. For example, in one such embodiment, the resource manager may provide a discount or pricing advantage to clients that select the flexible location option. The discount may be applied to either the one-time or upfront portion of the client's bill (i.e., a billing amount independent of the actual amount of time the resource is active), the usage-based portion of the bill (i.e., a billing amount proportional to the time a resource is actually used), or to both the one-time and usage-based portions. The discount may be made known to the clients via the interface implemented to support the specification of the flexible location option in some implementations.

In some implementations, different pricing incentives may be offered based on the extent of location flexibility the client is willing to accept. For example, if the client is willing to let the resource manager select a location for a reservation slot, but is not willing to let the resource manager transfer the reservation from one location to another, one discount may be applied. If the client is willing to allow the resource manager to select reservation slot locations and also transfer the reservations, a larger discount may be provided. In embodiments where the client is allowed to specify preferences for reservation and/or launch locations, the client may be given a larger discount if the client is willing to accept a location that is different from the preferred locations. In some embodiments, discounts related to flexible locations may be time dependent—e.g., for long-term reservations, the discount available for allowing reservation transfers by the resource manager may be a function of how much time remains in the term. Various combinations of pricing incentives may be implemented in different embodiments.

The resource manager may allow the client to specify transferability preferences in some embodiments. For example, the client may be offered a number of different reservation transferability policy options: one policy that allows the resource manager to transfer a reservation at any point in time before the reserved resource is activated, another policy that allows the reservation to be transferred only if a threshold amount of time has elapsed since the reservation was made, a third policy that allows a reservation to be transferred if the corresponding resource has remained idle or inactive for a certain time, and another policy that does not allow the resource manager to transfer reservations without the explicit consent of the client. It is noted that at least in some embodiments, transferring a reservation, especially of an instance that has already run for a while, may also involve transferring various other elements of the execution environment including the data set of the application. Different transferability options may have respective pricing incentives (or disincentives) associated with them in some implementations. In some embodiments the discounts associated with different flexible location options and reservation transferability options may themselves vary dynamically over time, e.g., in response to dynamically varying supply and demand.

In one embodiment, the resource manager may implement an API or other programmatic interface that allows the client to submit queries on the client's reservation and/or resource activation history. For example, for a given reservation request, the client may be able to use the interface to determine when and where the corresponding capacity was reserved or transferred, and where the resources were launched. In some embodiments, as noted above, the client may wish to initiate reservation transfers, e.g., for performance reasons, availability reasons, and/or pricing reasons. The interface may allow the client to submit requests for reservation transfers. In some implementations a reservation transfer request from a client may have an associated (and potentially dynamically varying) cost as well.

Example System Environment

FIG. 1 illustrates an example system environment, according to at least some embodiments. The system 100 includes a provider network 110 whose resources are distributed across a plurality of geographical regions, such as regions 112A and 112B. Each region in the illustrated embodiment comprises one or more availability zones 120, such as availability zones 120A, 120B and 120C in region 112A, and availability zones 120K, 120L and 120M in region 112B. A given availability zone may itself comprise portions or all of one or more data centers—for example, data center 160 of availability zone 120C. As noted above, a given availability zone may have isolated electrical power, cooling and/or heating equipment such that failures of such equipment at one availability zone does not cause any correlated problems at other availability zones. A plurality of resource instances 130, such as instances 130A, 130B, 130D, and 130E may be located at a given data center 160. In the illustrated embodiment, the subset of resource instances 130 at data center 160 that are currently in use (including instances 130A and 130B) are shown within an in-use resource pool 121A, and the subset of resource instances that are currently idle or available for activation (such as instances 130D and 130E) are shown in an available resource pool 121B. Capacity reservation slots 111A represent the number of instances reserved at data center 160 of availability zone 130C. As noted above, a slot 111 is a logical representation of a reservation set up for a client, indicating a commitment to activate a resource instance in response to an activation request from the reserving client. The system 100 also includes a resource manager 180 operable to receive and respond to various requests from clients 148, including for example resource reservation requests, resource activation requests, reservation transfer requests, reservation query requests, and the like. The resource manager 180 may in some embodiments store various kinds of information related to resource reservations and/or usage in a persistent repository such as resource management database 191. It is noted that while FIG. 1 shows the resource instances 130 of only one data center 160 of one availability zone 120C, each availability zone 120 of each region 112 may comprise a respective set of resource instances 130 resident at one or more data centers 160.

In the illustrated embodiment, the location of a given resource instance 130 may refer to its containing data center 160, availability zone 130, and/or geographical region 112. Decisions regarding where a particular capacity reservation is to be made, or where a resource is to be activated, may be made at any of these location levels in some embodiments. The boundaries of a region or an availability zone may be defined by the operator of the provider network 110, e.g., for administrative, cost, high-availability, performance or other operational reasons. Region boundaries, for example, may not necessarily coincide with geopolitical boundaries, and may change over time as more hardware is added by the provider network 110 operator, or as some data centers are decommissioned. Similarly, availability zone boundaries may change over the long term as well, depending for example on the high-availability characteristics of the hardware and software components being used for the various resource instances 130 and the physical plant and physical security characteristics of the data centers available (such as the ability to resist power outages, fires, earthquakes, floods and the like). In some embodiments, the locations at which resources of a provider network 110 are resident may be organized in a different manner than that shown in FIG. 1. For example, in some embodiments resource instances 130 may be organized in pairs (or other n-tuples with n>2) for high availability or replication, such that by default each instance has a corresponding peer instance in another location. In other embodiments a provider network 110 may consist simply of a collection of data centers, without intervening hierarchical layers such as regions or availability zones.

As noted earlier, a resource manager 180 may allow clients 148 to learn about, select, purchase access to, and/or reserve resource instances 130. In some embodiments, when requesting a reservation of a resource instance 130, a client 148 may be provided with several choices regarding where the instance should be reserved. For example, the resource manager 180 may implement a programmatic interface that allows clients to choose a location from among a plurality of location choices for a given reservation, such as various availability zones 120 and/or regions 112. In one embodiment, the client may be given an option to let the resource manager decide where to reserve resource capacity, e.g., by designating one or more of the capacity reservation slots 11 for the client. By selecting such a flexible-location option, those clients that may not necessarily be concerned about the specific physical locations (e.g., regions, availability zones, or data centers) of the resources provided to them as long as the clients' performance, availability, functionality and other characteristics are met, may be able to reduce the complexity of making resource reservations. In some cases, the resource manager 180 may also provide pricing incentive such as discounts to encourage clients to opt in for the flexible-location policy. Those clients that wish to request reservations in specified locations may be allowed to do so in some implementations; thus, the resource manager may be able to cater to varying levels of location specificity requirements for various clients.

When a reservation request indicating the flexible-location option is received, e.g., via one or more web forms, APIs or other programmatic interfaces supported by resource manager 180, the resource manager may identify one or more locations at which to obtain capacity reservation slots 111 using heuristics in some embodiments. In some implementations the heuristics may rely on the principle of affinity—that is, that in general it may be beneficial for a client to use resources that are closer together. For example, if the client 148 currently has some active resource instances in an in-use resource pool 121A at a particular data center 160, a slot 111 may be reserved at that same data center 160 for the client's new reservation request. If a slot is not available at the same data center 160 or availability zone 120, a slot at a nearby data center or availability zone may be chosen instead. The resource manager may access the client's resource reservation history, usage history, and/or billing history, which may be obtained for example from resource management database 191, to help identify the locations where the client has currently active instances. Similarly, the heuristics used may take into account the locations where a client has other current capacity reservation slots 111, locations where the client had reserved capacity in the past, and/or locations where the client had activated resource instances in the past. In some embodiments the heuristics may also take into account current and/or projected resource utilizations at various locations—e.g., if resource utilization records obtained by the resource manager 180 indicate that a particular availability zone is likely to be more heavily utilized than a second availability zone, the second availability zone may be preferred for the new reservation request.

After the slots at the selected locations are reserved, the client 148 may be notified that the reservation request was accepted. In some implementations, a client 148 that opted for the flexible location option may not be notified (at least by default) about exactly where capacity was reserved. In other implementations, the client may be notified of the capacity reservation locations. It is noted that the capacity reservation slots themselves may be implemented in a location-independent manner in some embodiments—that is, the slots may not be maintained or resident at the location with which they are associated. For example, the capacity slots 111 shown in the embodiment illustrated in FIG. 1 may actually be part of an in-memory data structure of the resource manager 180, and/or in a persistent data structure within resource management database 191.

When a resource activation request is received for the reserved capacity, the resource manager may determine where a resource instance 130 is to be launched, activated, or booted up. In some implementations, by default an instance 130 may be launched at the same location as the capacity slot for the corresponding reservation—e.g., if a slot 111 was being held for the client at data center 160, an instance may be launched at that same data center 160. In some implementations, the resource manager 180 may be configured to make a just-before-launch determination of where to launch an instance—that is, the resource manager 180 may choose launch locations taking operational conditions (such as current resource utilization levels, expected resource request loads in the near future, and the like) into account. In some embodiments, the resource manager 180 may be permitted to transfer resource reservations from one location to another, e.g., in accordance with a transferability policy associated with resource reservations. After a launch location is selected, a resource instance 130 may be activated for the client 148, and the client 148 may be informed that the instance was launched. The client 148 may then proceed to use the launched instance as desired.

In some embodiments, clients 148 may specify a set of preferences for resource reservations, e.g., using the programmatic interface provided by the resource manager 180. For example, a client 148 may wish to ensure that a resource reservation be replicated for high availability reasons, and may be able to specify the number of replicas desired via the interface. If the client indicates that N replicated reservations be made, the resource manager 180 may identify N different availability zones 120, and reserve a capacity slot 111 in each of the N availability zones. In such a scenario (assuming instances are launched at the same locations where slots are reserved), when the client 148 requests a resource activation, the resource manager 180 may select any of the N availability zones as the launch location. Even in the unlikely event that N−1 availability zones happen to be experiencing failures, the client 148 would be assured that the resource instance requested can still be launched in this example. In some implementations clients 148 may be billed depending on the number of replicated reservations they request—i.e., clients requesting more replicas may be charged more. In one embodiment, in addition to requesting N replicated reservations, a client may also wish to launch more than one instance for the same reservation for high availability purposes—e.g., a resource activation request may indicate the number of instances that the client wishes to activate for a specified reservation for which replicated reservations were made.

Resource Instances Categories and Associated Pricing Models

Figure 2A:
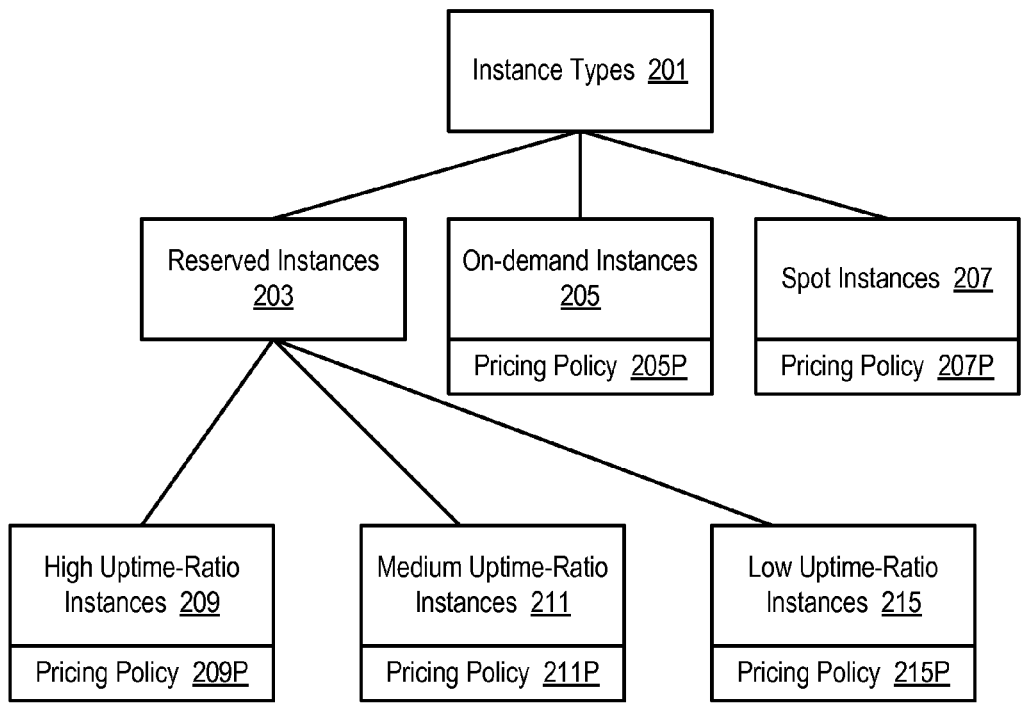
FIGS. 2a and 2b illustrate example resource instance classification approaches, according to at least some embodiments.
Figure 2B:
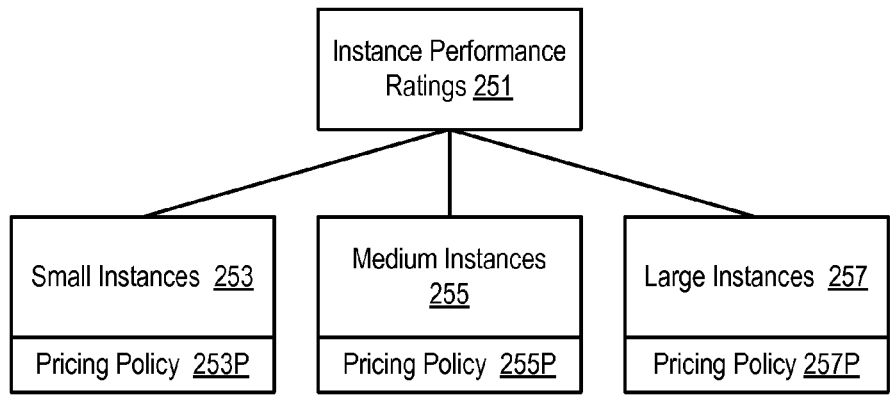

The resource instances 130 of a provider network may be grouped into classes or categories based on several different dimensions in some embodiments, and the pricing policies and location-related policies used for different classes may differ. FIGS. 2a and 2b illustrate example resource instance classification approaches, according to at least some embodiments. FIG. 2a illustrates an approach in which instances are classified based in part on the timing or duration of instance allocations—i.e., on when instances are obtained by clients and when they are released by the clients. Three high-level types 201 of resource instances are shown: reserved instances 203, on-demand instances 205, and spot-instances 207, each with respective pricing policies 203P, 205P and 207P. In one embodiment, a client 148 may reserve an instance for fairly long periods, such as a one-year term or a three-year term in accordance with the pricing policy 203P, by paying a low, one-time, upfront payment for the instance, and then paying a low hourly rate for actual use of the instance at any desired times during the term of the reservation. Thus, the client 148 may, by making the long-term reservation, be assured that its reserved instance 203 will be available whenever it is needed. In embodiments where pricing incentives are implemented for flexible-location options, either the upfront payment, the usage-based rate, or both, may be discounted for reserved instances. The amount of discount may differ based on various factors such as the level of flexibility allowed by the client in some implementations (e.g., clients that allow the resource manager 180 to only choose from a small set of preferred availability zones may be given a smaller discount than clients that allow the resource manager 180 to make reservations at any location).

If a client 148 does not wish to make a long-term reservation, the client may instead opt to use on-demand instances 205 (or spot instances 207). The pricing policy 205P for on-demand instances 205 may allow the client 148 to pay for resource capacity by the hour with no long-term commitment or upfront payments. The client 148 may decrease or increase the resource capacity used, based on application needs, and may only have to pay the hourly rate for the instances used. In some cases the per-hour pricing for on-demand instances may be higher than the hourly rate for reserved instances, because the relatively long durations of reservations may provides a more stable revenue stream to the operator of the provider network than the potentially more dynamic revenue stream provided by on-demand instances. Spot instances 207 may provide a third type of resource purchasing and allocation model. The spot pricing policy 307P may allow a client 148 to specify the maximum hourly price that the client is willing to pay, and the resource manager 180 may set a spot price for a given set of resource instances 130 dynamically based on the prices clients are willing to pay and on the number of instances available to support the spot model. If a client 148's bid meets or exceeds the current spot price, an instance may be allocated to the client. If the spot price rises beyond the bid of the client using a spot instance 207, access to the instance by the client may be revoked (e.g., the instance may be shut down). The need for the resource manager 180 to cater to the current or anticipated on-demand instance requests and spot instance requests at various locations within the provider network may influence the selection of locations for capacity reservations for long-term reservations. For example, if the resource manager 180 anticipates strong growth in on-demand usage and/or spot usage in a given availability zone 120 based on recent measurements and trends, the resource manager 180 may decide to select a different availability zone 120 as the location for a new long-term reservation.

The default prices of reserved instances 203, on-demand instances 205, and spot instances 207 may also vary based on the availability zones 120 or geographic regions in which the instances are located. The operator of provider network 110 may have had to pay different costs for setting up data centers in different physical locations, and may have to pay varying location-dependent ongoing costs for infrastructure and maintenance services such as network connectivity, cooling and so on, which may result in different pricing policies for different availability zones and/or regions. Such infrastructure-related cost differences may also be taken into account by a resource manager 180 that supports flexible-location options for resource reservations. Fluctuations in supply and demand may also result in time-varying prices for the different types of instances. Of course, the price for a given long-term reservation may typically remain unchanged once a client completes the reservation.

In some embodiments, reserved instances 203 may be further classified based on expected uptime ratios. The uptime ratio of a particular reserved instance 130 may be defined as the ratio of the amount of time the instance is activated, to the total amount of time for which the instance is reserved. Uptime ratios may also be referred to as utilizations in some implementations. If a client 148 expects to use a reserved instance for a relatively small fraction of the time for which the instance is reserved (e.g., 30%-35% of a year-long reservation), the client may decide to reserve the instance as a Low Uptime Ratio instance 215, and pay a discounted hourly usage fee in accordance with the associated pricing policy 215P. If the client 148 expects to have a steady-state workload that requires an instance to be up most of the time, the client may reserve a High Uptime Ratio instance 211 and potentially pay an even lower hourly usage fee, although in some embodiments the hourly fee may be charged for the entire duration of the reservation, regardless of the actual number of hours of use, in accordance with pricing policy 211P. An option for Medium Uptime Ratio instances 213, with a corresponding pricing policy 213P, may be supported in some embodiments as well, where the upfront costs and the per-hour costs fall between the corresponding High Uptime Ratio and Low Uptime Ratio costs. Clients 148 may specify the desired uptime ratio in reservation requests submitted via the interface provided by a resource manager 180 in some embodiments. When selecting reservation locations and/or launch locations, the resource manager 180 may take into account the requested uptime ratio as well. For example, if the client requests a Low Uptime Ratio, the resource manager may reasonably expect that the resource eventually activated for the Low Uptime Ratio reservation may be available at least some of the time to satisfy spot instance requests.

Instance pricing, and the corresponding flexible-location discounts, may also vary based on other factors. For example, in the case of compute instances, the performance capacities of different CPUs and other components of compute servers such as memory size may come into play. FIG. 2b shows an example classification of compute instances based on instance performance ratings 251. Large instances 253 may have more computing capacity than medium instances 255, which in turn may have more computing capacity than small instances 257. Accordingly, different pricing policies 253P, 255P and 257P may be implemented for the different sizes of instances, and when making location-based decisions, the resource manager 180 may have to take into account the number of instances of a particular size that are available at different locations. In some embodiments, software features such as operating systems, hypervisors, middleware stacks and the like may also be taken into account in determining the pricing policies associated with various instances. For both compute instances and storage instances, storage device characteristics such as total storage capacity, supported I/O rates and the like may be used to develop pricing policies in some implementations. Pricing policies may also be determined by networking capabilities and networking usage (e.g., number of megabytes of data transferred, and/or the distances over which network traffic is transmitted). Other classification dimensions and techniques, including extensions of the basic hierarchies shown in FIGS. 2a and 2b, may be implemented in other embodiments. Some or all of the pricing information may be stored in resource management database 191, and the resource manager 180 may retrieve the information from the database as needed.

Example Reservation-Related Options

Figure 3:
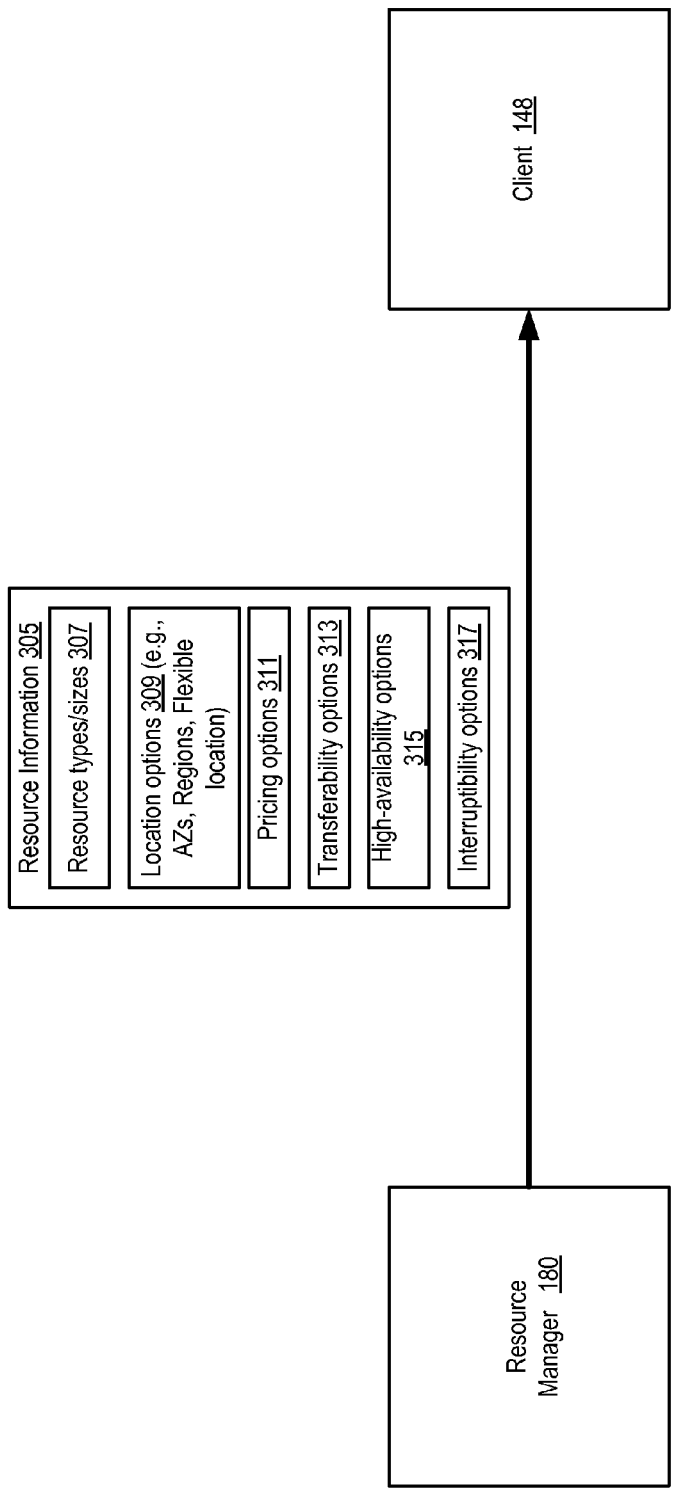
FIG. 3 illustrates an example of the types of resource reservation-related options that may be made available to a client by a resource manager, according to one embodiment.

FIG. 3 illustrates an example of the types of resource reservation-related options that may be made available to a client 148 by a resource manager 180, according to one embodiment. The resource manager 180 may for example provide the illustrated resource information 305 and options via a programmatic reservation interface, such as one or more web pages, an API, and/or a command-line interface. As shown, the resource information 305 may include an enumeration of the resource types and/or sizes 307 supported by the resource manager, which may describe the different resource reservation and allocation duration options supported (e.g., long-term reservations with different uptime ratios, on-demand reservations, and/or spot reservations as shown in FIG. 2a), as well as the performance ratings or capabilities (such as large vs. medium vs. small instances shown in FIG. 2b).

The reservation interface implemented by resource manager 180 may include reservation location options 309. In some embodiments, the resource manager may indicate (e.g., via a drop-down menu) the various geographical regions 112 and/or availability zones 120 in which resource capacity may be reserved by the client, and may describe the flexible-location option via the interface as well. In one implementation, the client 148 may be allowed to indicate preferred location options—e.g., one or more preferred geographical regions, or one or more preferred availability zones, for its reservation request. In some embodiments the client may be allowed to specify a generic location affinity preference without indicating specific locations—e.g., the client 148 may indicate that the resource manager should attempt to co-locate reservations for the client at the same location as much as possible, or as near an existing reservation or existing active instance as possible. Pricing options 311 for the different types and sizes of resources available may be indicated via the interface. At least a portion of the pricing for various types of capacity reservations and/or instances may be dependent on the location option selected by the client 148. In some implementations, the discounts applicable for reservation requests that specify flexible location options may also be displayed or described via the interface.

In some embodiments the resource manager 180 may support a plurality of reservation transferability options 313, and may provide information about such options via a portion of the reservations interface. For example, the client 148 may be able to specify a transferability preference that allows the resource manager to transfer capacity reservations to any location selected by the resource manager at any time prior to launch, without informing or obtaining further approval from the client. Other transferability preferences may specify, for example: (a) preferred sets of locations to which reservations may be transferred, (b) affinity-based preferences indicating that transfers to locations where the client has an existing reservation or in-use instance are preferred, (c) idle-time based preferences indicating that transfers are acceptable if an instance has remained idle or deactivated for a specified time, (d) launch-delay based preferences indicating that transfers are acceptable if a specified delay has elapsed since the reservation was made, during which the resource has not been activated or (e) an indication that reservations may not be transferred without explicit client approval. In some embodiments a client 148 may select a transferability option allowing the client to determine where the client's current capacity reservations such as slots 111 are located, and request a transfer of the reservations to another location. In one implementation some or all of the transferability options selectable by the client may have associated pricing incentives—e.g., a client willing to let the resource manager transfer reservations with few or no constraints may be given a discount relative to the rates charged to those clients that are unwilling to allow reservation transfers. Pricing incentives for the various transferability options may also be made known to clients via the reservations interface in such implementations. It is noted that transferring a reservation (of an instance that has been active for some period) from one location to another may in some cases also require transferring the data set being used by applications or services running on the instance, and replicating other execution environment conditions such as operating system tunable settings, security settings, and the like.

Clients 148 may also receive information about supported high-availability options 315 and associated pricing information in some embodiments via the reservations interface or interfaces. For example, a client 148 may be allowed to specify the number of replica capacity reservations to be made at different locations. A client that wishes to make sure that it remains possible to activate an instance despite a failure at any one availability zone 120 may specify a replica count of two, indicating that two slots 111 be reserved at respective availability zones. In some implementations a client may specify both a high-availability replica count greater than one and a flexible-location option. In such a scenario, if N replica reservations are requested, the resource manager 180 may select N different availability zones, and reserve equivalent capacity in each of the N selected availability zones. In some embodiments, information regarding other supported preferences such as desired interruptibility options 317 may also be provided to clients by the resource manager. Interruptibility settings may allow clients to indicate whether for example they are willing to allow in-use resource instances to be interrupted (i.e., to have the client's access to a resource instance 130 revoked) in return for paying a lower price for resource use. Various other types of details regarding resources 130 may be provided by the resource manager 180 in different embodiments, such as for example details of the software stacks supported at various resources, networking configuration options, clustering options and the like.

Reservation Requests and Responses

Figure 4:
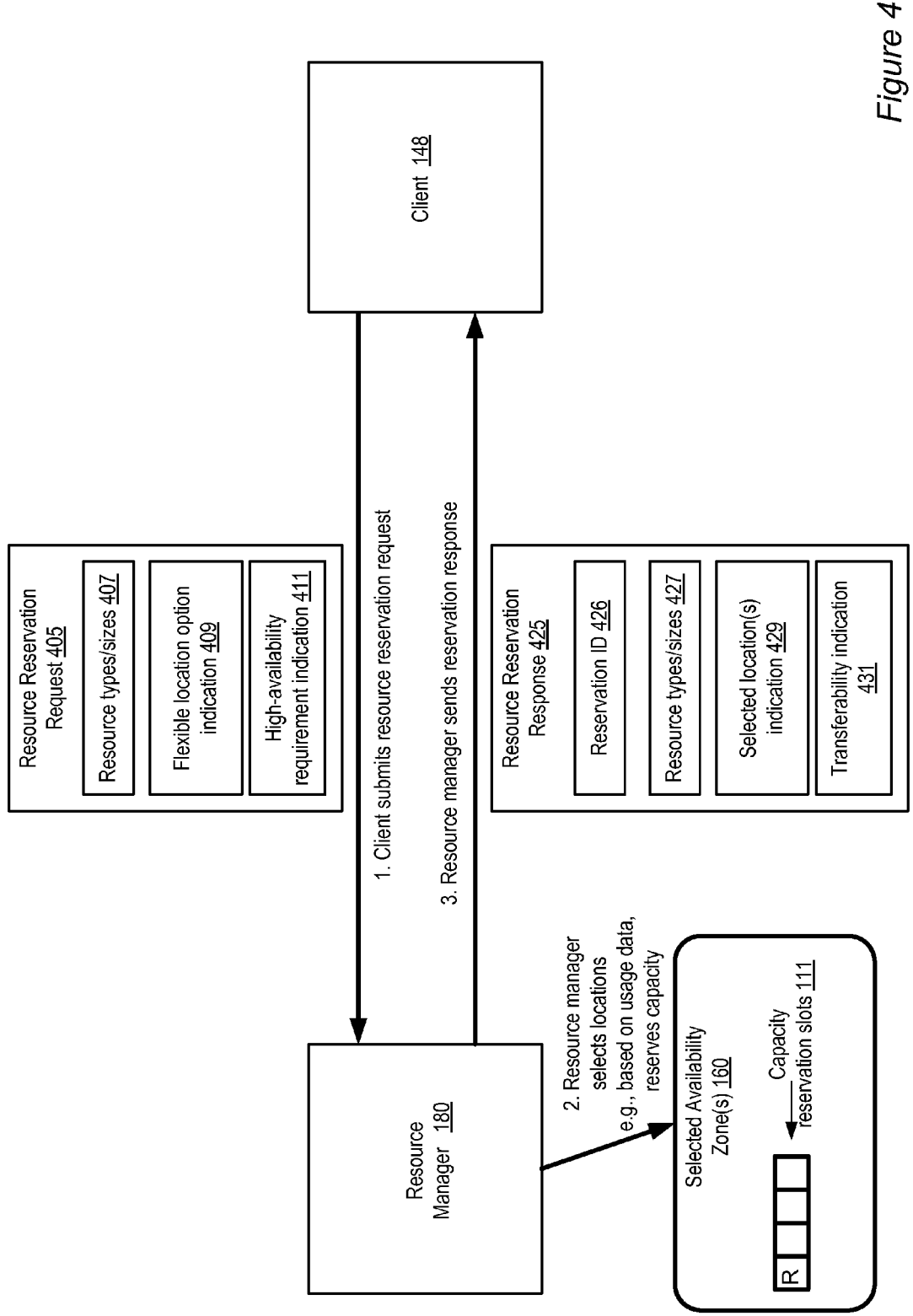
FIG. 4 illustrates examples of reservation related interactions between a client and a resource manager, according to at least some embodiments.

FIG. 4 illustrates examples of reservation related interactions between a client 148 and the resource manager 180, according to at least some embodiments. The resource manager 180 receives a resource reservation request 405 from a client 148, as indicated by the arrow labeled "1". The request may be received in accordance with a programmatic interface implemented by the resource manager 180 in some embodiments—e.g., a portion of the reservations interface discussed above. The resource reservation request 405 comprises an indication 407 of the type and size of the resource(s) to be reserved—e.g., for compute instance reservations, whether a large, medium or small instance is to be reserved, and the uptime ratio of the desired instance or instances. In some implementations each resource instance may require a distinct reservation request, while in other implementations requests for multiple instances may be combined. Reservation request 405 may include an indication 409 that the requesting client 148 wishes to let the resource manager 180 select the location (e.g., the availability zone, region, or data center) or locations at which capacity is to be reserved. In some implementations the client 148 may also be allowed to specify the kinds of heuristics the resource manager 180 should use to select the locations—e.g., whether the client wishes to locate the capacity reservation based on affinity or proximity with other locations previously or currently used by the same client for other reservations. In some embodiments the client may include an indication of a high availability requirement 411 for the requested reservation—for example, the client may specify the number of distinct slots 111 to be reserved at respective availability zones. Other details regarding the specifics of the resources to be reserved may be included in the reservation request 405 as well, e.g., details on the desired software stacks, networking configuration, and the like.

In response to the reservation request 405, the resource manager 180 may select the locations at which to reserve capacity for the client 148, such as one or more availability zones 160. As shown by the arrow labeled "2" in FIG. 4, the resource manager may use one or more heuristics based on resource utilization data in selecting the locations. Different types of resource utilization and/or pricing data may be used in different implementations—e.g., the resource manager 180 may look up the client's past and/or current resource utilization data or billing data, or the resource manager 180 may look at the current operational data obtained from various locations of the provider network 110 to determine the locations that have sufficient resource capacity slots available. In some embodiments, when multiple locations are available to satisfy a reservation request, the resource manager 180 may use a random selection algorithm or a round-robin algorithm to select the specific location at which to reserve capacity. When the location (or multiple locations, for example to support replica reservations for high availability) have been selected, the resource manager may designate one or more capacity reservation slots 111 for the client 148, as indicated by the letter "R" in one of the slots shown in FIG. 4. A record of the reservation (e.g., including a slot identifier and/or an identification of the location of the slot, the size and type of the resource being reserved and any other pertinent characteristics of the reservation) may be stored in resource management database 191 in some implementations.

The resource manager may send a reservation response 425 to the client 148, confirming the type and size 425 of the instances reserved, as indicated by the arrow labeled "3". The reservation response may include a reservation identifier 426, which may be usable by the client for a resource activation request, reservation queries, and the like. In some embodiments, the reservation response may include an indication 429 of the selected location, and/or an indication 431 of the transferability setting of the reservation. In other embodiments the selected location and/or transferability settings may not be provided to the client 148 unless the client submits a query asking for such details.

Activation Requests and Responses

Figure 5:
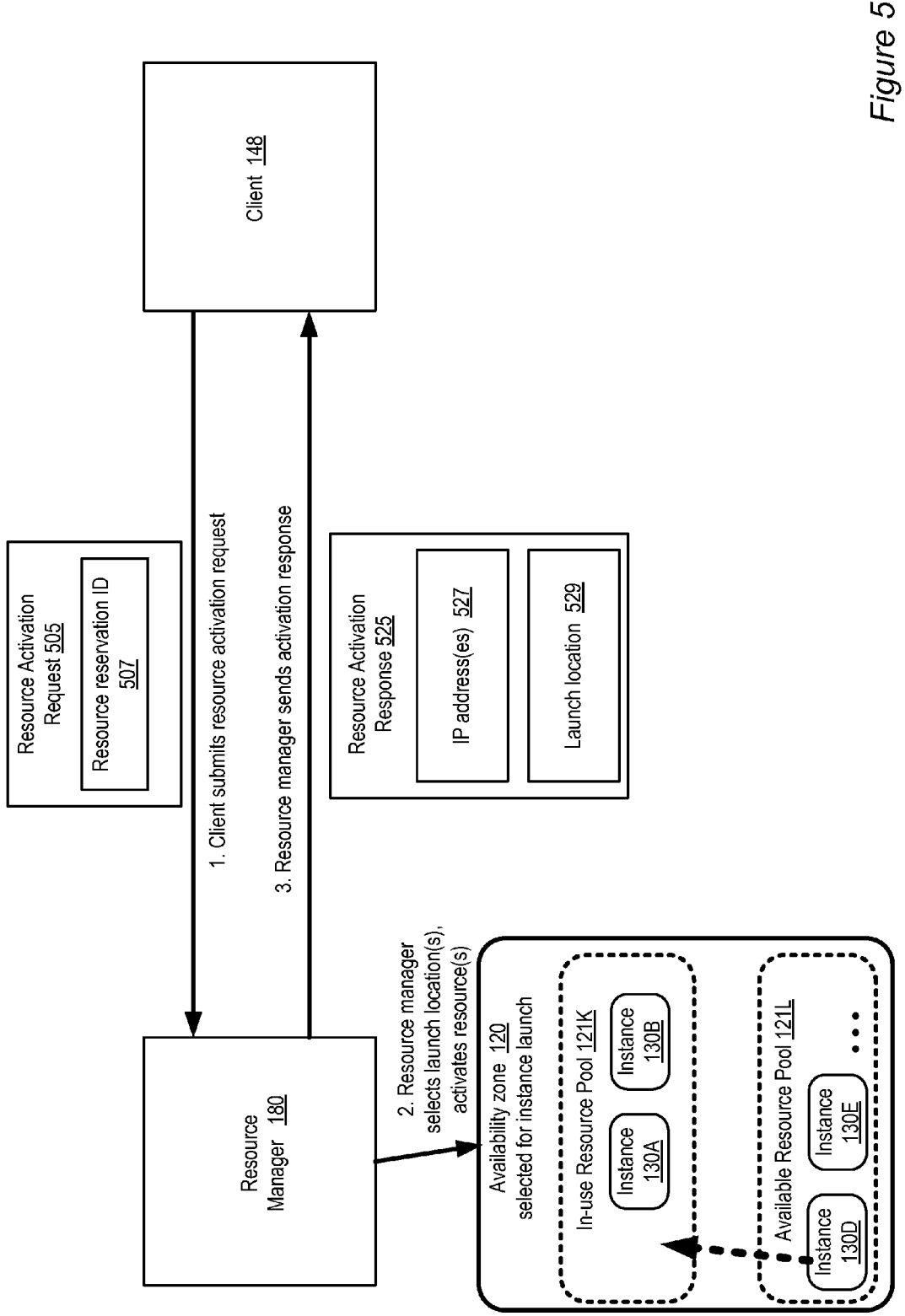
FIG. 5 illustrates examples of resource activation related interactions between a client and a resource manager, according to at least some embodiments.

FIG. 5 illustrates examples of resource activation related interactions between a client 148 and the resource manager 180, according to at least some embodiments. After the client 148 has received a response to its reservation request indicating that the requested capacity has been reserved on the client's behalf, the client may submit a resource activation request 505, as indicated by the arrow labeled "1" in FIG. 5, requesting the resource manager 180 to activate or launch the reserved instance 130. The resource activation request may indicate the reservation ID 507 identifying the client's reservation. On receiving the activation request, the resource manager may then look up the details of the reservation using the ID 507—e.g., the size and type of the instance, the current location of the reservation slot 111, and so on. The reservation details may be retrieved from the resource management database 191 in some embodiments.

The resource manager 180 may then select one or more launch locations at which an instance or instances 130 are to be activated for the client, as indicated by the arrow labeled "2" in FIG. 5. An available instance or instances of the desired size may then be launched (e.g., booted up with the desired machine image or boot image in the case of compute instances) at the selected launch location(s). In the example illustrated in FIG. 5, the resource manager may move the selected available instance 130D from available resource pool 121L to in-use resource pool 121K at the availability zone 120 selected for the launch. The resource manager 180 may then send an activation response 525 to the client 148 in some implementations, including the launch location 529 and any other information such as one or more IP addresses 527 that the client 148 may need to access and use the instance.

A number of different approaches may be used to select launch locations in different embodiments. As a default, in one embodiment instances may be launched at the same locations where the corresponding capacity slots 111 were initially designated for the client's reservation request. Depending on the transferability settings for the reservation, in some embodiments the resource manager may have transferred the reservations to a different location, based for example on observed trends in resource demand and supply. In one scenario, a resource manager 180 may be allowed to transfer a reservation if a specified amount of time has elapsed since the initial reservation was made, and the resource has not been activated in the interim. In another scenario, a reservation may be transferred if an instance has been inactive (e.g., powered down) for a specified time interval at its current location. Reservations may have been transferred in response to client requests in accordance with the transferability settings supported in some embodiments. For example, prior to submitting an activation request 505, a client may submit a query to determine the location of a reservation slot 111 corresponding to a reservation identifier 507. If the current location is satisfactory to the client, the activation request may indicate that the resource manager 180 should activate the resource at that location. If the client wishes to launch the instance at a different location, e.g., in an availability zone at which the client has other running instances 130, the client may request the resource manager to launch the instance at the different location. In some implementations clients may incur a reservation transfer billing charge for such transfers.

Example Web-Based Interfaces for Reservation Requests and Queries

FIG. 6 illustrates a portion of an example web-based interface that may be implemented by resource manager 180 to allow clients 148 to submit resource reservation requests, according to some embodiments. As shown, the interface may comprise a web page 600 including a number of different regions and fields. The web page 600 may include a welcome message area 603 and a discount reminder area 604 emphasizing the pricing advantage that may be obtained if a client selects the flexible location option. A number of different form fields may be implemented to obtain the client's preferences for the capacity to be reserved. The size of the resource instance to be reserved may be specified via field 605, and the number of instances to be reserved may be specified via field 607.

For field 609 may be used to specify the duration or term of the reservation, and form field 611 may be used to specify the starting date and/or time of the reservation. High availability preferences for the reservation, such as the reservation replica count indicating the number of distinct availability zones in which capacity slots are to be reserved may be specified via form field 613. Location preferences may also be specified via form fields of web page 600. Using form field 615, the client 148 may either specify one or more preferred regions, or indicate that the resource manager 180 is free to select a region for the reservation. The default setting shown for the region field 615, "I don't care—you choose the region" may serve as an indication that the client has opted in for a flexible-location option. If the client selects a particular preferred region or group of preferred regions using the equivalent of form field 615, the specification a flexible-location option at the availability zone level may still be possible. For example, the client could select Region 112A (shown in FIG. 1) via form field 615, and then select the "I don't care—you choose the availability zone" option via form field 617. If the flexible-location option is selected at the region level, the client may not be given a choice to select availability zones, e.g., form field 617 may be grayed out in some implementations. In addition to the flexible location settings specifiable via the "I don't care . . . " options for form fields 615 and 617, in some embodiments the resource manager may also allow other types of location preferences to be specified—e.g., one of the options selectable for field 617 may be "Please try to reserve instances in the same locations where my other instances are running", indicating an affinity-based location preference.

In embodiments where different settings for reservation transferability are supported, a form field 619 may be used to specify the client's desired transferability setting. For example, the default "I don't care" setting shown for field 619 may indicate that the resource manager is free to move the client's reservations from one location to another. In embodiments where different interruptibility settings are supported, the client may specify interruptibility preferences via form field 621.

The pricing incentives being provided to clients willing to accept flexible location reservations may be made apparent via elements similar to the elements 623, 625 and 627 shown in FIG. 6. These elements of web page 600 may be filled in automatically by the resource manager 180 depending on the choices made for other fields by the client—e.g., the base price 623 for a reservation may depend on the resource size selected by the client. Discounts for flexible location and/or transferability options selected by the client, if any, may be shown via element 625, and the net price for the reservation may be shown via element 627. By selecting various different options for location and/or transferability, a client 148 may be able to specify various what-if scenarios and determine the price impact of different option combinations. After the client has decided the parameters to specify for the reservation request, the "Next" button 631 may be used to proceed to the next stage of the reservation process.

Figure 7:
FIG. 7 illustrates a portion of an example web-based interface that may be implemented by a resource manager to allow clients to submit reservation queries, according to some embodiments

As noted earlier, in some embodiments clients may submit queries regarding their resource reservations, e.g., to determine the locations where resources are currently reserved. FIG. 7 illustrates a portion of an example web-based interface that may be implemented by resource manager 180 to allow clients 148 to submit reservation queries, according to some embodiments. As shown, the web interface may include web page 700 with several elements specifying information about a particular reservation made for the client. Web page 700 may contain a message area 703. The size of the reserved instance may be indicated via element 705, and the number of capacity slots reserved may be indicated via element 707. In embodiments supporting high availability reservation replication, the number of replicas for the reservation may be shown via an element 709. The start and end dates of the term of the reservation may be shown via elements 710 and 711 respectively. The current status of the reservation, e.g., whether the instance is currently active or not, may be indicated via element 712. In some implementations, the client may be provided with a web page control such as a clickable link 713 to request an activation of the reserved instance if its current state is inactive.

Information about the location of the reserved instance, e.g., the region and/or availability zone, may be provided via an element 715. In the illustrated example, the client had chosen a flexible location option for the reservation, as indicated by the word "Flexible" in field 715. If the instance had been reserved at a location specified by the client, instead of the flexible location option, the region and/or availability zone may have been displayed in field 715. In some embodiments, a clickable control element 716 may allow the client to submit a location query for the reservation—i.e., to request the resource manager to display the location where the capacity slot is reserved. In some implementations another clickable control element 717 may be provided to allow the client to request a transfer of the reservation from one location to another. Button 731 may be used to return to the user to the previous page or a home page of the web site.

Methods to Implement Flexible-Location Reservations and Resource Activations

Figure 8:
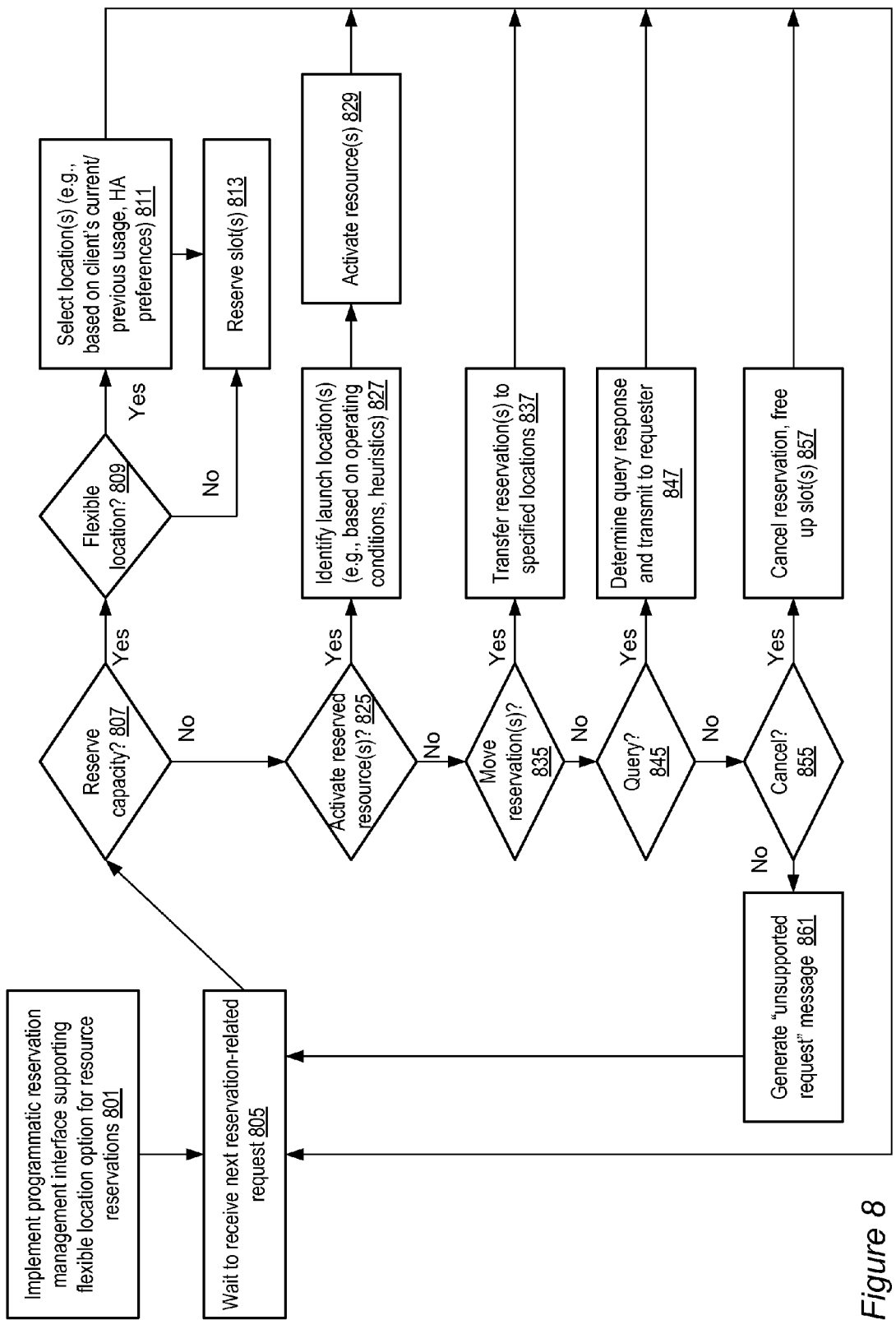
FIG. 8 is a flow diagram illustrating aspects of the functionality of a resource manager dealing with resource reservation-related requests, according to at least some embodiments.

FIG. 8 is a flow diagram illustrating aspects of the functionality of the resource manager 180 dealing with reservation-related requests, according to at least some embodiments. As shown in element 801, a programmatic reservation management interface may be implemented, supporting a flexible location option for resource reservations according to which the resource manager is responsible for selecting locations at which resources are reserved for a client, i.e., without specific locations being specified by the clients. The resource manager 180 may wait for the next request received in accordance with the interface, as shown in element 805. A number of different types of reservation-related requests may be received via the interface. Depending on the nature of the request, the resource manager 180 may take a corresponding set of actions.

If the next request received is a resource reservation request, as determined in element 807, and the flexible location option is specified in the request, as determined in element 809, the resource manager may select one or more particular locations for the reservation, as indicated in element 811. The locations may be selected using heuristics based on resource utilization data, the high availability preferences specified in the request, and/or a number of other factors. For example, the resource manager 180 may use recent resource usage measurements to identify lightlyloaded locations, or may use usage or billing records of the client to find locations that the client has used previously or is using currently, and select such a location for the reservation. For requests that specify high availability requirements, the resource manager may choose multiple distinct locations at which to reserve capacity, so that client may be assured that the desired type of instance may be activated even in the event of failures affecting one location. Having identified the locations, either by making its own location selection in accordance with the flexible location policy or as specified in the reservation request by the client, the resource manager 180 may reserve the desired number of slots (element 813) and inform the client that the requested reservation has been made.

If the next request received is a resource activation or enablement request for an existing reservation, as determined in element 825, the resource manager 180 may identify the launch location where the resource is to be activated. If the transferability settings for the reservation allow the resource manager to move reservations from one location to another, the resource may be activated at a location different from the location where a slot was initially reserved in response to the client's reservation request. As shown in element 827, the resource manager may determine the launch locations based on various heuristics and/or current operational conditions, such as the current resource usage levels at various possible launch locations. By default in some embodiments, the launch location may be the same as the initial reservation location. In some implementations, the client 148 may be able to specify a desired launch location, or criteria to be used to select launch locations, as part of the resource activation request. The resource manager may then activate the resources (e.g., boot or bring up a desired machine image on a virtual compute instance), as shown in element 829, and notify the client that the requested resource has been activated.

In some embodiments, the resource manager 180 may support client-requested reservation transfers. If the next request received is a reservation move request, as determined in element 835, and the resource manager is in a position to allow the transfer (e.g., if sufficient free slots are available at the designated destination location specified by the client), the reservation may be transferred as per the request (element 837). If the request comprises a reservation query (as detected in element 845), e.g., to identify the location of a reservation, the resource manager may look up the desired information in the resource management database 191 or some other appropriate data source and provide a response to the querying client (element 847). If a reservation cancelation request is received (element 855), the resource manager 180 may free up the corresponding reservation capacity slots (element 857). If an unsupported request is received, an error message may be transmitted to the requester (element 861). After completing the operations responsive to a request, the resource manager may resume waiting for the next request received via the interface. It is noted that in some embodiments the operations illustrated in FIG. 8 may be performed by the resource manager 180 in a different order than that shown, and that, for example, the determination of the request type may be performed using the logical equivalent of a "case" or "switch" statement instead of the sequence of decisions shown in elements 807, 825, 835, 845 and 855. In at least one embodiment, each of the elements 807, 825, 835, 845 and 855 and the corresponding actions taken in response to the decision made in the element may represent a response to a different API call, web request, or command-line tool invocation. For example, one API call C1 may result in the operations depicted in elements 807, 809, 811 and 813, while a different API call C2 may result in the operations depicted in elements 825, 827 and 829. In some embodiments, multiple threads of the resource manager may be implemented to perform various operations in parallel.

Figure 9:
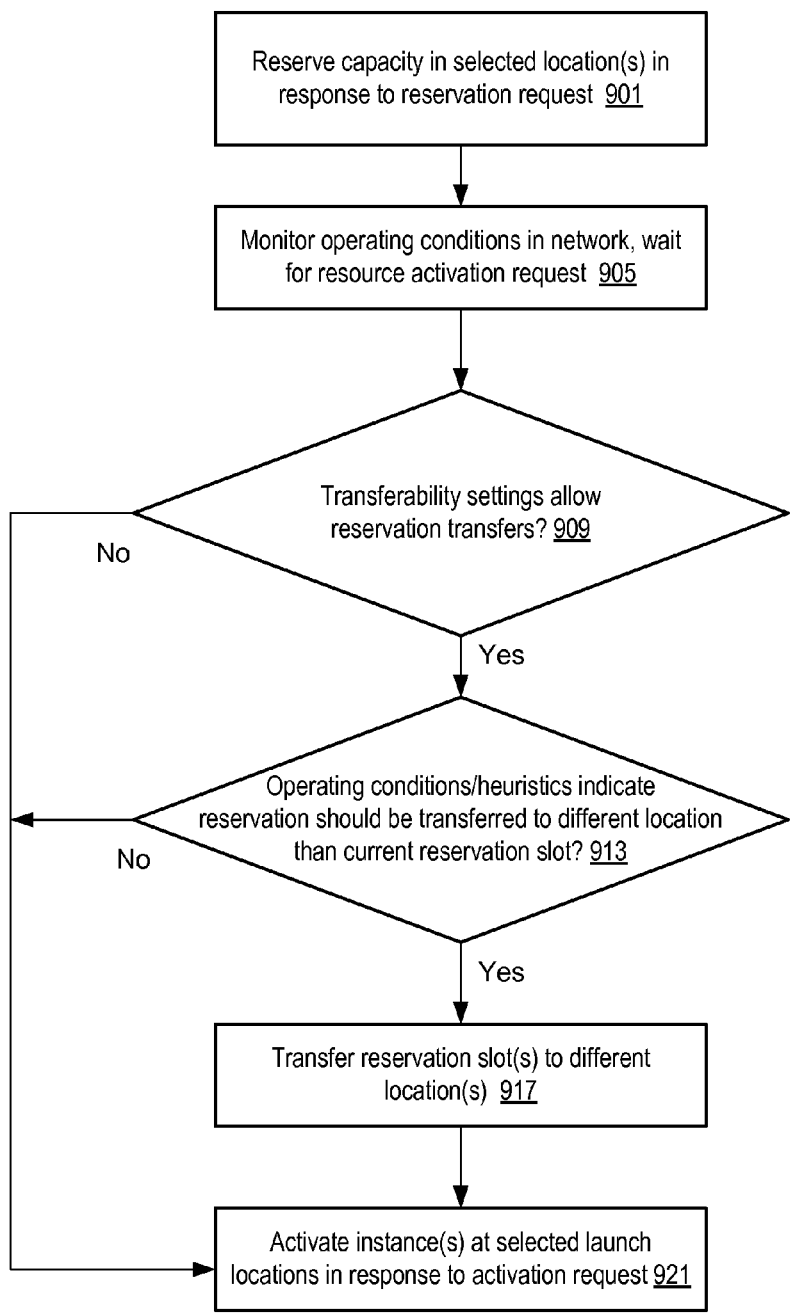
FIG. 9 is a flow diagram illustrating aspects of the functionality of a resource manager related to resource activation location selection, according to at least some embodiments.

FIG. 9 is a flow diagram illustrating aspects of the functionality of the resource manager 180 related to resource activation location selection, according to at least some embodiments. As shown in element 901, the resource manager 180 may reserve capacity at selected locations in response to resource reservation requests. After the capacity has been reserved and the client has been notified, the resource manager may then wait for a resource activation request for the reserved capacity, and monitor operational conditions in the provider network (element 905). The monitored operational conditions may include a variety of metrics in different embodiments, such as resource utilization levels, reservation slot availability, pricing changes, network traffic levels, and the like. If the transferability settings for the reservation allow reservations to be transferred (as determined in element 909), and if the operational conditions and/or other heuristics used to select launch locations indicate that it would be preferable to move the reservation to another location prior to launching or activating the resource (as detected in element 913, the resource manager 180 may transfer the reservation to a different location (element 917). The resource may then be launched or activated at the selected launch location (element 921) in response to an activation request. If the transferability settings do not allow reservation transfers, or if the heuristics/operational conditions do not indicate that a transfer is advisable, the resource may be activated at the same location as the current location of its reservation slot 111.

The resource manager 180 may transfer reservations based on a variety of factors in different implementations, including some of the same kinds of reasons that were used to select reservation locations for flexible-location reservations. For example, if the current and/or anticipated future resource usage levels at the current reservation location are high or trending higher, the resource manager 180 may wish to transfer the reservation to a less busy location. Similarly, in some cases it may be advisable to transfer the reservation to a location where the client to whom the reservation belongs already has other resources running or reserved. To transfer a reservation from location A to location B, the resource manager may in one embodiment identify a slot 111 for the same size and type of capacity at location B, designate it as a slot reserved for the client, and then release the original slot at location A. To launch a resource such as a compute instance, the instance may be booted up with a desired machine image or boot image specified by the client. In some embodiments the decision to transfer a reservation may be made independently of the times at which activation requests are received, while in other embodiments transfer decisions may be triggered by activation requests.

In some cases a resource instance may be launched at a location A in response to a client's activation request, and the client may later temporarily deactivate the resource after executing a desired workload for a while. During the workload execution, some data may be generated which may be required when and if the workload is resumed. In such a scenario, if a decision to transfer the reservation slot is to be made after the data is generated, the cost of transferring the data (or, alternatively, accessing the data remotely from a different location) may have to be taken into account by the resource manager. The data may have to be transferred from one set of storage devices at location A to another set of storage devices at a new launch location B for optimal performance in some cases, while accessing the data over the network between locations B and A may be acceptable in other cases. Other elements of the execution environment of an instance, such as various operating system settings, executable path settings, network settings and the like, may also have to be transferred (i.e., various parameters may have to be set the same way at the destination of the transfer as they were at the source).

Example Use Cases

The techniques described above for supporting flexible-location resource reservations and resource activations may be useful in a wide variety of environments. As the size and complexity of cloud-based resource provisioning grows, and more and more applications are deployed into cloud environments, the probability that resources of a particular type or in a particular data center remain underutilized, while at the same time demand for that same type of resource somewhere else is high, will also tend to grow. The ability of a resource manager to match peaks in demand with currently idle resources will be useful in maintaining high customer satisfaction, and will also help provider network operators to maximize their own return on investment.

The functionality described above may also help encourage new cost-conscious clients to try the services offered by the provider network. For example, clients whose applications, once launched, can run fairly independently without requiring frequent external communication, may be attracted by the pricing benefits such as discounts offered in exchange for selecting the flexible-location option. The reduction in the number of decisions a client has to make when requesting a reservation may also help to attract and retain additional customers.

Illustrative Computer System

Figure 10:
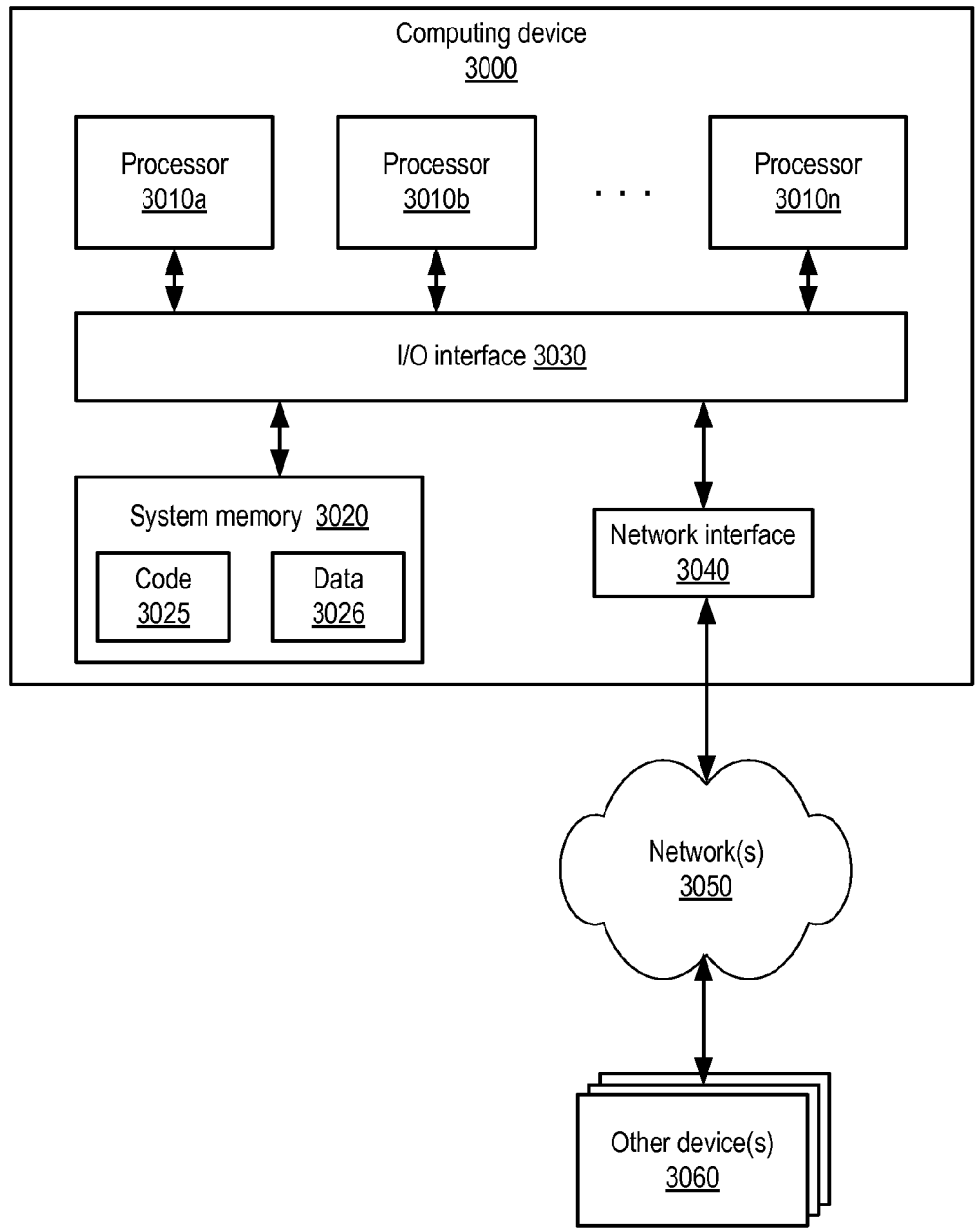
FIG. 10 is a block diagram illustrating an example computing device that may be used in some embodiments.

In at least some embodiments, a server that implements a portion or all of one or more of the technologies described herein, including the techniques to implement the functionality of resource manager 180, may include a general-purpose computer system that includes or is configured to access one or more computer-accessible media. FIG. 10 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIGS. 1 through 9, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIGS. 1 through 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems.

The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a plurality of computing devices configured to implement a plurality of resources of a provider network distributed among multiple locations; and
one or more computing devices of the provider network configured to implement a resource manager;
wherein the resource manager is operable to:
implement a programmatic interface to allow a client to specify a flexible location option for a resource reservation request, wherein the flexible location option indicates that the resource manager is to select one or more locations of the multiple locations at which to reserve resource capacity in response to the request, wherein each location of the multiple locations is part of a respective availability zone of a plurality of availability zones of the provider network, wherein each availability zone has an availability profile independent of the availability profiles of other availability zones, and wherein the flexible location option indicates that the resource manager is to select the one or more locations from among the plurality of availability zones;
in response to a resource reservation request received from a client via the interface, wherein the flexible location option is specified for the request, select one or more particular locations at which to reserve resource capacity based at least in part on resource utilization data; and
in response to a resource activation request corresponding to the resource reservation request, activate one or more resources at one or more launch locations selected from the plurality of locations.

2. The system as recited in claim 1, wherein the resource reservation request comprises an indication of a desired high availability level for a resource instance with a specified performance rating, wherein the one or more particular locations comprise a first location and a second location different from the first location, and wherein the resource manager is further operable to reserve sufficient resource capacity at each of the first and second locations to activate a resource instance with the specified performance rating at either location of the first and second locations.

3. The system as recited in claim 1, wherein the flexible location option comprises an indication of a preferred set of availability zones from which to select the one or more particular locations.

4. The system as recited in claim 1, wherein one particular location of the one or more particular locations is selected based on a proximity of the one particular location to at least one of: (a) a previously selected location at which a resource was activated in response to a previous resource activation request from the client, (b) a currently used location at which a resource is currently activated on behalf of the client or (c) a previously selected location at which resource capacity was reserved in response to a previous resource reservation request from the client.

5. The system as recited in claim 1, wherein the resource manager is further operable to:
prior to activating the one or more resources, transfer a resource capacity reservation of the client from one location of the one or more particular locations to a different location, based at least in part on monitored operational conditions within the provider network;
wherein a launch location of the one or more launch locations comprises the different location.

6. The system as recited in claim 1, wherein the resource manager is further operable to:
provide an indication to the client of a pricing advantage associated with selecting the flexible location option.

7. A method, comprising:
implementing a programmatic interface to allow a client to specify a flexible location option for a resource reservation request directed to a resource manager of a provider network, wherein the flexible location option indicates that the resource manager is to select one or more locations of multiple locations of the provider network at which to reserve resource capacity in response to the request, wherein each location of the multiple locations is part of a respective availability zone of a plurality of availability zones of the provider network, wherein each availability zone has an availability profile independent of the availability profiles of other availability zones, and wherein the flexible location option indicates that the resource manager is to select the one or more locations from among the plurality of availability zones;
in response to a resource reservation request received from a client via the programmatic interface, wherein the flexible location option is specified for the request, selecting one or more particular locations at which to reserve resource capacity based at least in part on resource utilization data; and
in response to a resource activation request corresponding to the resource reservation request, activating one or more resources at one or more launch locations selected from the plurality of locations.

8. The method as recited in claim 7, wherein the resource reservation request comprises an indication of a desired high availability level for a resource instance with a specified performance rating, wherein the one or more particular locations comprise a first location and a second location different from the first location, and wherein the resource manager is further operable to reserve sufficient resource capacity at each of the first and second locations to activate a resource instance with the specified performance rating at either location of the first and second locations.

9. The method as recited in claim 7, wherein the flexible location option comprises an indication of a preferred set of availability zones from which to select the one or more particular locations.

10. The method as recited in claim 7, further comprising:
selecting one particular location of the one or more particular locations based on a proximity of the one particular location to at least one of: (a) a previously selected location at which a resource was activated in response to a previous resource activation request from the client, (b) a currently used location at which a resource is currently activated on behalf of the client or (c) a previously selected location at which resource capacity was reserved in response to a previous resource reservation request from the client.

11. The method as recited in claim 7, further comprising:
prior to activating the one or more resources, transferring a resource capacity reservation of the client from one location of the one or more particular locations to a different location of the plurality of locations, based at least in part on monitored operational conditions within the provider network;
wherein a launch location of the one or more launch locations comprises the different location.

12. The method as recited in claim 11, wherein said transferring is in accordance with a transferability policy made accessible to the client, wherein the transferability policy indicates that the resource manager is allowed to transfer a given capacity reservation from one location to another if a specified amount of time has elapsed since the corresponding reservation request was received.

13. The method as recited in claim 11, wherein said transferring is in accordance with a transferability policy made accessible to the client, wherein the transferability policy indicates that the resource manager is allowed to transfer a given capacity reservation from one location to another if the resource that was last activated in accordance with the capacity reservation has remained inactive for a specified time period.

14. The method as recited in claim 11, wherein the monitored operational conditions indicate that the different location has greater currently available resource capacity than the one location.

15. The method as recited in claim 7, further comprising:
providing an indication to the client of a pricing advantage associated with selecting the flexible location option.

16. The method as recited in claim 7, wherein the interface allows the client to determine the one or more particular locations selected in response to the resource reservation request, and the one or more launch locations selected in response to the resource activation request.

17. The method as recited in claim 7, wherein the interface allows the client to request a transfer of a resource capacity reservation from a particular location of the one or more locations to a different location.

18. A non-transitory computer-accessible storage medium storing program instructions that when executed on one or more processors:
implement a programmatic interface to allow a client to specify a flexible location option for a resource reservation request directed to a resource manager of a provider network, wherein the flexible location option indicates that the resource manager is to select one or more locations of multiple locations of the provider network at which to reserve resource capacity in response to the request, wherein each location of the multiple locations is part of a respective availability zone of a plurality of availability zones of the provider network, wherein each availability zone has an availability profile independent of the availability profiles of other availability zones, and wherein the flexible location option indicates that the resource manager is to select the one or more locations from among the plurality of availability zones;
in response to a resource reservation request received from a client via the interface, wherein the flexible location option is specified for the request, select one or more particular locations at which to reserve resource capacity based at least in part on resource utilization data; and
in response to a resource activation request corresponding to the resource reservation request, activate one or more resources at one or more launch locations selected from the plurality of locations.

19. The storage medium as recited in claim 18, wherein the resource reservation request comprises an indication of a desired high availability level for a resource instance with a specified performance rating, wherein the one or more particular locations comprise a first location and a second location different from the first location, and wherein the instructions when executed on the one or more processors:
reserve sufficient resource capacity at each of the first and second locations to activate a resource instance with the specified performance rating at either location of the first and second locations.

20. The storage medium as recited in claim 18, wherein the flexible location option comprises an indication of a preferred set of availability zones from which to select the one or more particular locations.

21. The storage medium as recited in claim 18, wherein the instructions when executed on the one or more processors:
select one particular location of the one or more particular locations based on a proximity of the one particular location to at least one of: (a) a previously selected location at which a resource was activated in response to a previous resource activation request from the client, (b) a currently used location at which a resource is currently activated on behalf of the client or (c) a previously selected location at which resource capacity was reserved in response to a previous resource reservation request from the client.

22. The storage medium as recited in claim 18, wherein the instructions when executed on the one or more processors:
prior to activating the one or more resources, transfer a resource capacity reservation of the client from one location of the one or more particular locations to a different location of the plurality of locations, based at least in part on monitored operational conditions within the provider network;
wherein a launch location of the one or more launch locations comprises the different location.

23. The storage medium as recited in claim 18, wherein the instructions when executed on the one or more processors provide an indication to the client of a pricing advantage associated with selecting the flexible location option.

24. The storage medium as recited in claim 18, wherein the interface allows the client to determine the one or more particular locations selected in response to the resource reservation request, and the one or more launch locations selected in response to the resource activation request.

25. The storage medium as recited in claim 18, wherein the interface allows the client to request a transfer of a resource capacity reservation from a particular location of the one or more locations to a different location.

\* \* \* \* \*